United States Patent Office 2,900,284
Patented Aug. 18, 1959

2,900,284

PROCESS FOR THE SACCHARIFICATION OF CELLULOSE-CONTAINING MATERIAL

Motoyoshi Oshima, Shibuya-ku, Tokyo-to, Jun Kusama, Ota-ku, Tokyo-to, and Tadao Ishii, Tsurumi-ku, Yokohama-shi, Japan No Drawing. Application September 30, 1955
Serial No. 537,894

3 Claims. (Cl. 127—37)

The present invention relates to an improved process for the saccharification of cellulose-containing material. More particularly, it relates to the combined process which comprises pretreating cellulose-containing material with dilute acid to remove most part of hemicellulose therefrom, adding hydrochloric acid to the pretreated material, after the same is dried, in an amount that makes the amount of water 45–70 parts per 100 parts of the dried material, suspending this mixture in hydrogen chloride gas at a temperature below 75° F. to make the hydrogen chloride gas adsorbed thereto, and further suspending the same mixture in hydrogen chloride gas to complete the hydrolysis reaction of the cellulose at a temperature above 75° F.

An object of the present invention is to effectuate an industrial application of fluidization method or transportation method to saccharification of cellulose-containing material by removing hemicellulose therefrom and by maintaining the amount of water needed for hydrolysis at a minimum, whereby viscosity of the saccharified product is suppressed.

Another object of the present invention is to make it possible to saccharify the material quickly and efficiently by carrying out prompt and uniform cooling, adsorption and heating necessary for the reaction, and at the same time, to recover the acid used economically.

Further objects, features and advantages of this invention will be apparent from the description which follows:

Hitherto, methods for saccharifying cellulose-containing material such as wood, straw, bamboo, and the like have been widely studied by many people in the world and some of the methods have been industrialized.

The principles of saccharification consist mainly of a simple hydrolysis of the cellulose-containing material with acid. However, when concentrated acid is used for the purpose, recovery of acid is very troublesome, and when dilute acid is used decomposition of produced sugar is unavoidable because high temperature and high pressure should be adopted. Hydrochloric acid or sulphuric acid is generally used as the acid for the said saccharification, in the former case concentrated acid or hydrogen chloride gas being used and in the latter case normal dilute acid being used at a high temperature and high pressure.

The process which uses concentrated hydrochloric acid and dilute sulphuric acid was practised in Germany and in Austria and was known as the Rheinau process and the Scholler process, respectively.

We have found after various studies that the process using hydrogen chloride gas which is regarded as an improvement of the concentrated hydrochloric acid process has specific characteristics in comparison with other processes and is industrially very advantageous.

The said process which uses hydrogen chloride gas reduces the amount of concentrated hydrochloric acid to be used and carries out saccharification while passing hydrogen chloride gas through the raw material in apparently almost dry condition. The Prodor process is this type of process and it is regarded that the Darboven process, in which hydrogen chloride gas passes through dried saw-dust suspended in a solvent such as carbon tetrachloride, is also this type of process.

Merits of the process which uses hydrogen chloride gas are as follows.

(1) As hydrolysis is carried out in the atmosphere of hydrogen chloride gas, the concentration of the hydrochloric acid is maximum and reaction velocity is high. On the contrary, in the conventional dipping process in which raw material is dipped in concentrated hydrochloric acid, the said acid will be adsorbed into the raw material, thereby concentration of the acid is reduced and reaction velocity is slow.

(2) When cooling and heating necessary for the reaction are carried out promptly by adoption of suitable conditions, the period of time necessary for completion of the reaction is only about one hour.

(3) When reaction is carried out while maintaining the water contained in the cellulose-containing material at an amount above half by weight of the said material, the reaction progresses almost quantitatively.

(4) According to this process, the amount of water contained in the saccharified product is very little, so that simple and economical recovery of hydrochloric acid can readily be attained by passing heated gas through the said product. On the contrary, in the dipping process, in which the raw material is dipped in concentrated acid, a large amount of steam is necessary for recovering hydrochloric acid, because the concentrated acid contained in lignin should be substituted for water.

(5) The raw material of the Rheinau process is mainly chip and the amount of saw-dust which can be mixed therewith should be less than 10% of the amount of the chip, but in the method which uses hydrogen chloride gas either chip or saw-dust may be used.

As described above, the method which uses hydrogen chloride gas has many industrially excellent characteristics, but viscosity of the final product is relatively high, so that treatment thereof is very difficult and the yield of the reaction and acid recovery is reduced. Furthermore, quantity of heat which generates in the process adsorbing hydrogen chloride gas is very great while heat conductivity of the cellulose-containing material such as saw-dust is very little, so that heat removal from the reaction zone is very difficult. Accordingly, the apparatus needs to be large in size and complex in operation and particularly acid-proof material is necessary, thereby industrialization of the said process has not yet been achieved.

On the other hand, the most suitable industrial process for promptly cooling or heating the raw material of low heat conductivity such as saw-dust is to treat the material by suspending the same in a gas stream uniformly. To go through this suspension, so-called fluidization method is mainly used, although other methods such as gas stream transportation and the like may be applicable; but this method has the disadvantage that the reaction product has considerably high viscosity, because concentrated sugar liquid produced here is very viscous. This viscosity is caused by the fact that a certain amount of water is necessary for the saccharifying reaction of cellulose as this reaction is hydrolysis and by the fact that the sugar of the reaction product is water soluble.

For the suppression of viscosity of the product, the following countermeasures are considered.

(a) Reduction of amount of the water to be mixed in the raw material as much as possible.

(b) Removal of presaccharified part from the raw material by pretreating a part of the said material.

We have examined minimum amount of water necessary for reaction in the process which uses hydrogen chloride gas. According to the Prodor process, addition amount of water per 100 parts of dried saw-dust is about 60 parts and according to some literatures it is indicated that the period of time necessary for saccharification is very long when the amount of water is below 50 parts.

We have found as a result of our experiments that when the said amount of water contained is below 50 parts per 100 parts of dried saw-dust, the reaction is very inferior; when the amount reaches 50 parts, the reaction progresses to some degree; when the same surpasses 60 parts, the reaction advances satisfactorily. However, it has also been revealed that the development of viscosity of the reaction product is unavoidable when the amount of water exceeds 50 parts.

Accordingly, we have examined the case in which the material obtained by removing the saccharified part through pretreatment is used as the raw material for the saccharification of cellulose. Main ingredients of the cellulose-containing raw material are hemicellulose which can readily be saccharified by dilute acid, cellulose which can be saccharified only by concentrated acid with the exception that it is treated at a very high temperature and lignin which is not affected by any acid. The sugar obtained by decomposition of the said hemicellulose contains large amount of pentose and the sugar obtained by decomposition of the said cellulose is mainly dextrose.

For economical industrialization of the process for saccharifying cellulose-containing material such as wood, straw and the like, crystal dextrose should be manufactured as main product and the yield thereof should be increased to the highest extent. Most industrial utilization of pentose is to apply it to the manufacture of furfural, but the dextrose coexisting with the said pentose is apt to be decomposed and polymerized, resulting in loss of the product. Accordingly, the most economical process is the process of two steps which comprises pretreating cellulose-containing material with dilute acid to produce furfaral by separating the pentose, subjecting the product so pretreated to a hydrolysis to obtain pure dextrose, and then crystallizing the dextrose with higher yield.

We have discovered that an excellent unviscid reaction product causing no trouble in the operation of either fluidization or gas stream transportation is obtained, reaction yield above 95% is obtainable, and recovery of hydrogen chloride gas and hydrochloric acid is attainable by passing heated gas through the product in a very easy, efficient manner.

The treatment in accordance with the invention comprises using cellulose-containing material deprived of hemicellulose by pretreatment, adding a suitable amount of hydrochloric acid to the material in dry condition, the said amount being selected so that water of 45–70 parts may be contained in the said mixture per 100 parts of the pretreated dry material, causing said mixture to adsorb hydrogen chloride gas at a temp. below 75° F. by passing hydrogen chloride gas through the said mixture, and then subjecting the product to saccharification at a temp. above 75° F.

Furthermore, we have confirmed that although the amount of hemicellulose contained in the raw material varies from 20% to 30% in accordance with the type of material, removal of only half or more of the hemicellulose is enough for the prevention of production of viscid product. When water of an amount over 50 parts is contained per 100 parts of dried raw material, the reaction progresses over 90% and when water of an amount over 60 parts is contained the reaction progresses over 95%, but more water is not effective for the reaction and viscidity of the product will appear when the water amount contained is over 70 parts.

Instead of addition of hydrochloric acid in the pretreated cellulose-containing material, the process of adding water to the pretreated cellulose-containing material to obtain a suitable water content and then passing hydrogen chloride gas therethrough may be used with similar reaction, but this process is industrially inferior because of large amount of the heat generated by adsorption reaction. Even when hydrochloric acid is added to the pretreated cellulose-containing material, relatively large amount of heat will generate when hydrogen chloride gas is passed therethrough. In our invention, adsorption of hydrogen chloride gas is made complete while maintaining the adsorption temperature at a value below 70° F. during ultimate period of the adsorption and there are the following intimate relations between saccharification rate and adsorption temperature.

| Adsorption temp., ° F | 55 | 60 | 70 | 75 |
|---|---|---|---|---|
| Saccharification rate, percent | 97 | 97 | 91.5 | 79.6 |

In the adsorption of hydrogen chloride gas, adsorption temperature may be raised by adoption of high pressure. For example, when pressure of hydrogen chloride gas is raised to an absolute pressure of 2 kg./cm.$^2$, saccharification rate above 95% will be obtained even when adsorption temp. is raised up to 75° F.

We have found that when a pretreated cellulose-containing material is used, apart from viscosity, reaction velocity is higher than that of nonpretreated cellulose-containing material. The said fact seems to be due to the fact that hemicellulose is removed by pretreatment to form porous raw material of broken cell membrane, thereby resin, ashes and the like are removed and reaction between acid and cellulose becomes easy.

The period of time necessary for completion of the reaction for adsorbing hydrogen chloride gas and heating operation is within about 30 minutes and saccharification is more than 95% in the case of adoption of pretreating, but is more than two hours in the case of adoption of no pretreating.

According to this invention, fluidization or gas stream transportation method can effectively be used for heating and recovering steps because viscosity of the reaction product is effectively suppressed.

In this invention, by suppressing viscosity of the reaction product, we applied fluidization or gas stream transportation method to saccharification which uses hydrogen chloride gas. We have found that this method makes it possible to use simpler and cheaper apparatus as compared with the Prodor process, and that cooling, adsorbing and heating operations are carried out rapidly and uniformly, bringing about a large increase of capacity and efficiency of the apparatus; so that characteristic merits of the process which uses hydrogen chloride gas can be more enhanced without accompanying disadvantages of the conventional process of using hydrogen chloride gas.

Remarkable disadvantage of the industrial saccharification of wood, as seen in the Rheinau process, consists in the fact that acid recovery is very difficult and expensive, but in this invention acid recovery can be economically executed with simple method such as drying with heated air.

The following examples show illustratively some embodiments, wherein the present invention is carried out.

*Example 1*

Mixture of 2 pounds of dried saw-dust from Japan cedar, the said dust being 10–100 mesh, and 5% hydrochloric acid was subjected to a boiling for 30 minutes at a normal pressure. The said product was washed with water and dried, thereby product of 1.6 pounds was obtained. The said dried product was charged in a glass cylinder of 6 inch inner diameter and 3 foot height and fluidized therein by passing hydrogen chloride gas of 40° F. through the said cylinder at a rate of 700 cubic feet per inch. Then 1.6 pounds of 40% hydrochloric acid was sprinkled on the fluidized zone while passing cold hydrogen chloride gas so as to maintain the fluidized zone at an adsorption temperature below 60° F.

Next, hydrogen chloride gas was passed through the fluidized zone for 30 minutes while maintaining the fluidized zone at a reaction temperature of 104° F. Then, the reaction product was heated by passing hydrogen chloride gas of higher temperature through the fluidized zone and thus the hydrogen chloride gas and hydrochloric acid contained in the reaction product were evaporated. Hot water was added to the product so dried containing sugar and lignin to solve sugar and then lignin was filtered off. The sugar liquid so obtained was subjected to a saccharification at a temperature of 250° F. after dilution up to 15%, thereby 0.8 pounds of dextrose was gained. Sugar yield was 92% of the theoretical yield.

*Example 2*

Saw-dust of beech was pretreated with 1.0% hydrochloric acid for 40 minutes at a temperature of 266° F., yield thereof being 66% by weight against dry material. The pretreated product was mixed with 40% hydrochloric acid at a mixing ratio of 1:1 by weight.

The said mixture after being freed from the pretreatment hydrolysis products was fluidized by continuously charging it, at a rate of 60 pounds per hour, into a hydrogen chloride gas adsorbing tower of 18 inch diameter and 9 foot height while passing upwardly hydrogen chloride gas of 32° F. through the said tower to adsorb hydrogen chloride gas at a temperature of 60° F.

The said product was continuously taken out and charged into another reaction tower of same type.

In the said tower, the material charged was subjected to a hydrolysis at a temperature of 100° F. by passing upwardly heated hydrogen chloride gas through the said tower while fluidizing the reaction material. And then the said reaction product was continuously taken out and charged into a recovery tower of 12 foot height and 25 inch diameter.

In the recovery tower, hydrogen chloride gas and hydrochloric acid were evaporated and recovered by passing heated hydrogen chloride gas through the said tower.

The dried product composed of crude sugar and lignin was then converted and purified, thereby sugar of 2 pounds was gained per hour with yield of 90% based on theoretical yield.

*Example 3*

Saw-dust of beech was pretreated with 1.0% hydrochloric acid for 40 minutes at a temperature of 266° F., yield thereof being 66% by weight against dry material. The pretreated product was mixed with 40% hydrochloric acid at a mixing ratio of 1:1 by weight.

The said mixture after being freed from the pretreatment hydrolysis products was continuously charged into a pipe of 1¼ inch inner diameter and 30 foot length at a rate of 60 pounds per hour in terms of the pretreated dry material into which hydrogen chloride gas was sent at a high speed of 70 feet per second. Then the said mixture was transported through the pipe by making the same suspended and dispersed uniformly in the stream of hydrogen chloride gas. The said mixture was cooled by cooling medium in a jacket around the pipe while the same adsorbed hydrogen chloride gas at a temp. 60° F. The material was then charged into a pipe of same diameter and 3½ foot length into which hydrogen chloride gas was sent at a speed same as above, the mixture of which was heated by heating medium in a jacket while it was transported to complete hydrolysis reaction at a temp. 100° F.

After the above operations, the said material was charged into a pipe of same diameter and 50 foot length into which hydrogen chloride gas was sent at the same speed, and the same was heated in the same manner as above to recover hydrogen chloride gas and hydrochloric acid by evaporation.

Although this invention may be practised with any of the modifications described in the preceding specification it is obvious that other changes may be made without departing from the nature and spirit of this invention. The details set forth in the preceding specification are not to be construed as limitations upon the scope of the invention except the extent incorporated in the following claims.

We claim:
1. In the process of saccharifying cellulose-containing material by pretreating the said material with dilute acid to remove hemi-cellulose therefrom and treating the resulting residue with hydrogen chloride gas, the steps of drying the pretreated material, adding an amount of hydrochloric acid to said dried material such that 45–70 parts of water will be contained in the said mixture per 100 parts of said dry material, suspending said mixture in a hydrogen chloride gas stream at a temperature below 75° F., and thereby causing said material to absorb said hydrogen chloride gas, and subjecting the resulting product to complete hydrolysis by suspending the same in a hydrogen chloride gas stream at a temperature of the order of 100° F.

2. In the process of saccharifying cellulose-containing material by pretreating the said material with dilute acid to remove hemi-cellulose therefrom and treating the resulting residue with hydrogen chloride gas, the steps of drying the pretreated material, adding an amount of hydrochloric acid to said dried material such that 45–70 parts of water will be contained in the said mixture per 100 parts of said dry material, fluidizing said mixture in a cooled hydrogen chloride gas stream at a temperature below 75° F., and thereby causing said material to absorb said hydrogen chloride gas, and subjecting the resulting product to complete hydrolysis by fluidizing the same in a heated hydrogen chloride gas stream at a temperature of the order of 100° F.

3. In the process of saccharifying cellulose-containing material by pretreating the said material with dilute acid to remove hemi-cellulose therefrom and treating the resulting residue with hydrogen chloride gas, the steps of drying the pretreated material, adding an amount of hydrochloric acid to said dried material such that 45–70 parts of water will be contained in the said mixture per 100 parts of said dry material, transporting said mixture as a suspension in a hydrogen chloride gas stream through an externally-cooled reaction zone at a temperature below 75° F., and thereby causing said material to absorb said hydrogen chloride gas, and subjecting the resulting product to complete hydrolysis by transporting the same as a suspension in a hydrogen chloride gas stream through an externally-heated reaction zone at a temperature of the order of 100° F.

References Cited in the file of this patent

UNITED STATES PATENTS

| | | |
|---|---|---|
| 1,641,771 | Meiler | Sept. 6, 1927 |
| 1,795,166 | Farber | Mar. 3, 1931 |
| 1,851,822 | Farber | Mar. 29, 1932 |
| 2,752,270 | Specht | Jan. 26, 1956 |

FOREIGN PATENTS

| | | |
|---|---|---|
| 336,935 | Great Britain | Oct. 20, 1930 |